(12) United States Patent
Webb et al.

(10) Patent No.: US 8,484,856 B1
(45) Date of Patent: Jul. 16, 2013

(54) DEVICE AND METHOD FOR MEASURING AND ADJUSTING THE SLOPE OF A SURFACE

(71) Applicant: 7 Cousins LLC, York, SC (US)

(72) Inventors: Alan David Webb, York, SC (US); Lloyd David Booth, Fort Mill, SC (US)

(73) Assignee: 7 Cousins LLC, York, SC (US)

( * ) Notice: Subject to any disclaimer, the term of this patent is extended or adjusted under 35 U.S.C. 154(b) by 0 days.

(21) Appl. No.: 13/680,548

(22) Filed: Nov. 19, 2012

(51) Int. Cl.
*G01C 9/00* (2006.01)

(52) U.S. Cl.
USPC .............................................. 33/371; 33/373

(58) Field of Classification Search
USPC ..................... 33/370–373, 379, 381–383, 343
See application file for complete search history.

(56) References Cited

U.S. PATENT DOCUMENTS

| | | | | |
|---|---|---|---|---|
| 2,901,836 A | * | 9/1959 | Hall | 33/373 |
| 5,154,000 A | * | 10/1992 | Mahoney et al. | 33/371 |
| 5,421,094 A | * | 6/1995 | McCord et al. | 33/373 |
| 5,884,408 A | * | 3/1999 | Simmons | 33/494 |
| 6,012,228 A | * | 1/2000 | Fisanich | 33/289 |
| 6,029,359 A | * | 2/2000 | Szumer | 33/373 |
| 6,173,502 B1 | * | 1/2001 | Scarborough | 33/371 |
| 6,502,322 B2 | * | 1/2003 | Smochek | 33/373 |
| 6,640,456 B2 | * | 11/2003 | Owoc et al. | 33/382 |
| 6,839,973 B1 | * | 1/2005 | Woodward | 33/371 |
| 7,644,506 B2 | * | 1/2010 | Wong | 33/373 |
| 8,061,051 B2 | * | 11/2011 | Allemand | 33/371 |
| 2001/0034945 A1 | * | 11/2001 | Smochek | 33/373 |
| 2008/0271331 A1 | * | 11/2008 | Allemand | 33/371 |
| 2012/0151785 A1 | * | 6/2012 | Lettkeman et al. | 33/301 |

* cited by examiner

*Primary Examiner* — Yaritza Guadalupe-McCall
(74) *Attorney, Agent, or Firm* — Shumaker, Loop & Kendrick, LLP

(57) ABSTRACT

The invention is a method and device for measuring the slope of a surface. The device includes a frame, one or more clear tubes containing a liquid and a gas bubble, and an attachment facilitating attachment to a sloped surface. The attachment may be a removable strap or magnets. The tubes are fixed at angles greater than zero degrees and less than ninety degrees relative to the bottom surface of the frame and a visual indication of the angle of each tube is present on the device. The device is designed to be placed parallel to the slope of a sloped surface and the slope of the surface can then be increased or decreased such that the gas bubble will become centered within the tube when the angle of slope conforms to a desired standard.

16 Claims, 6 Drawing Sheets

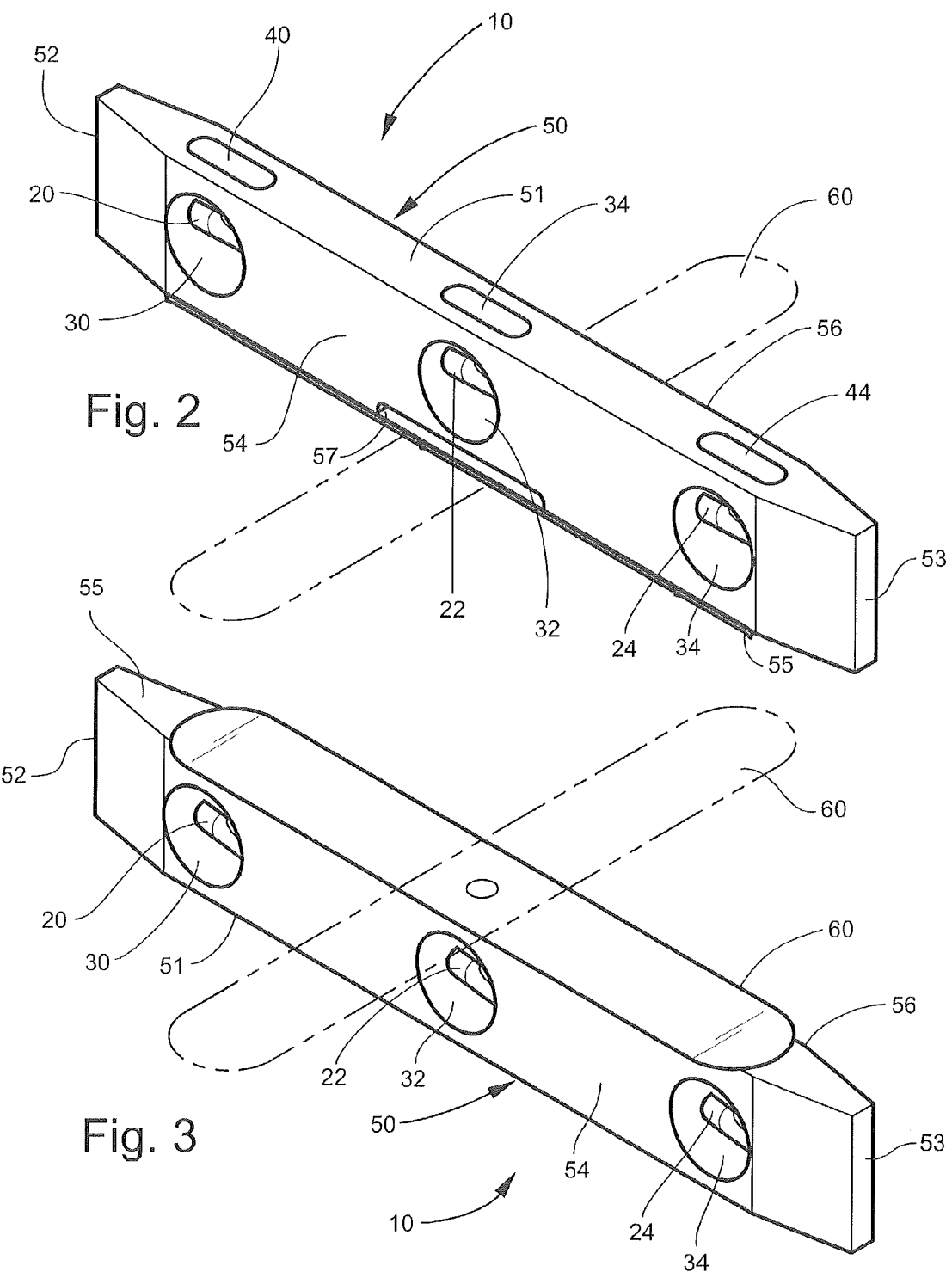

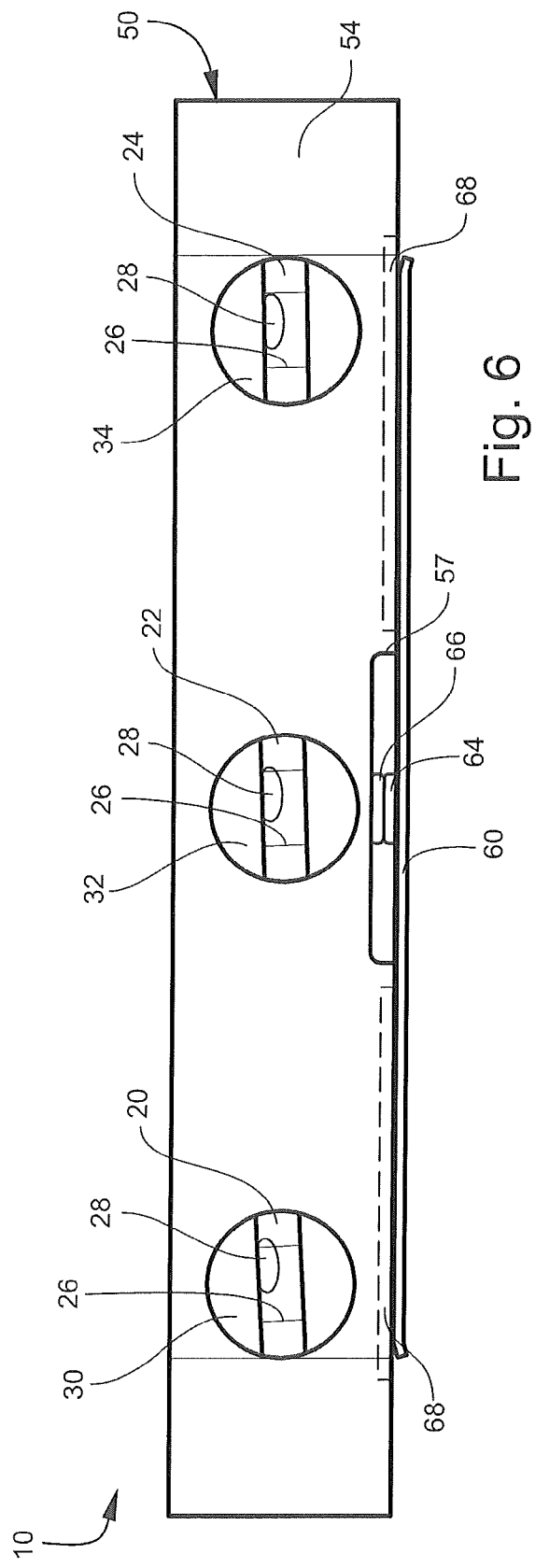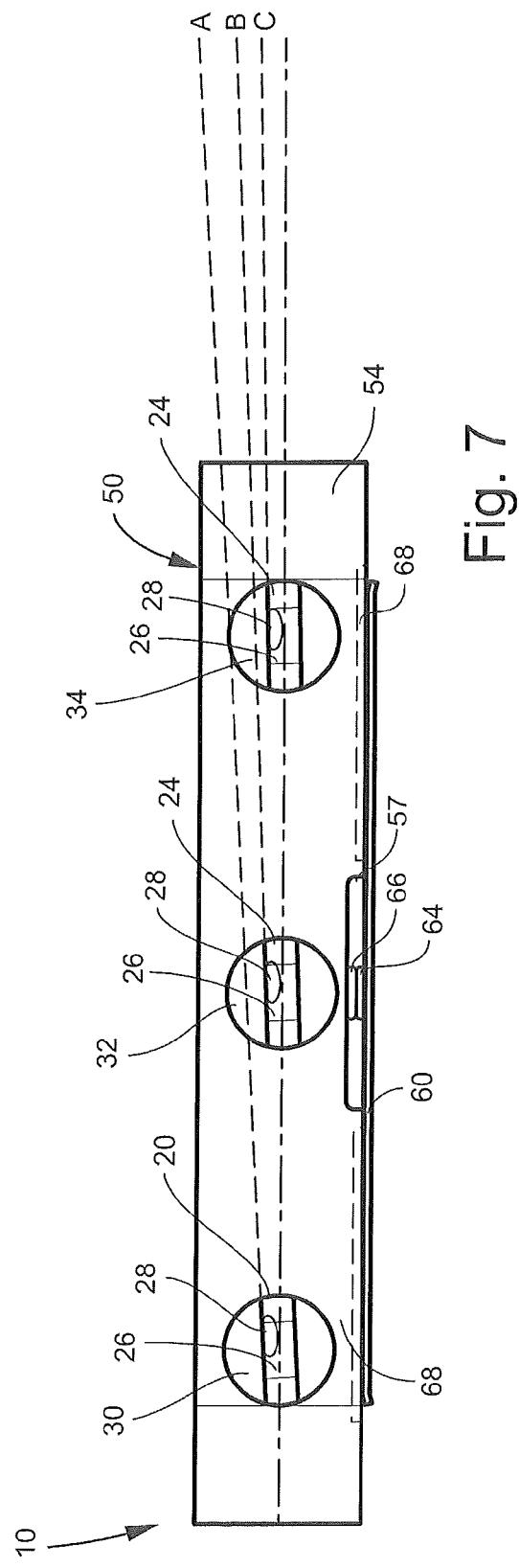

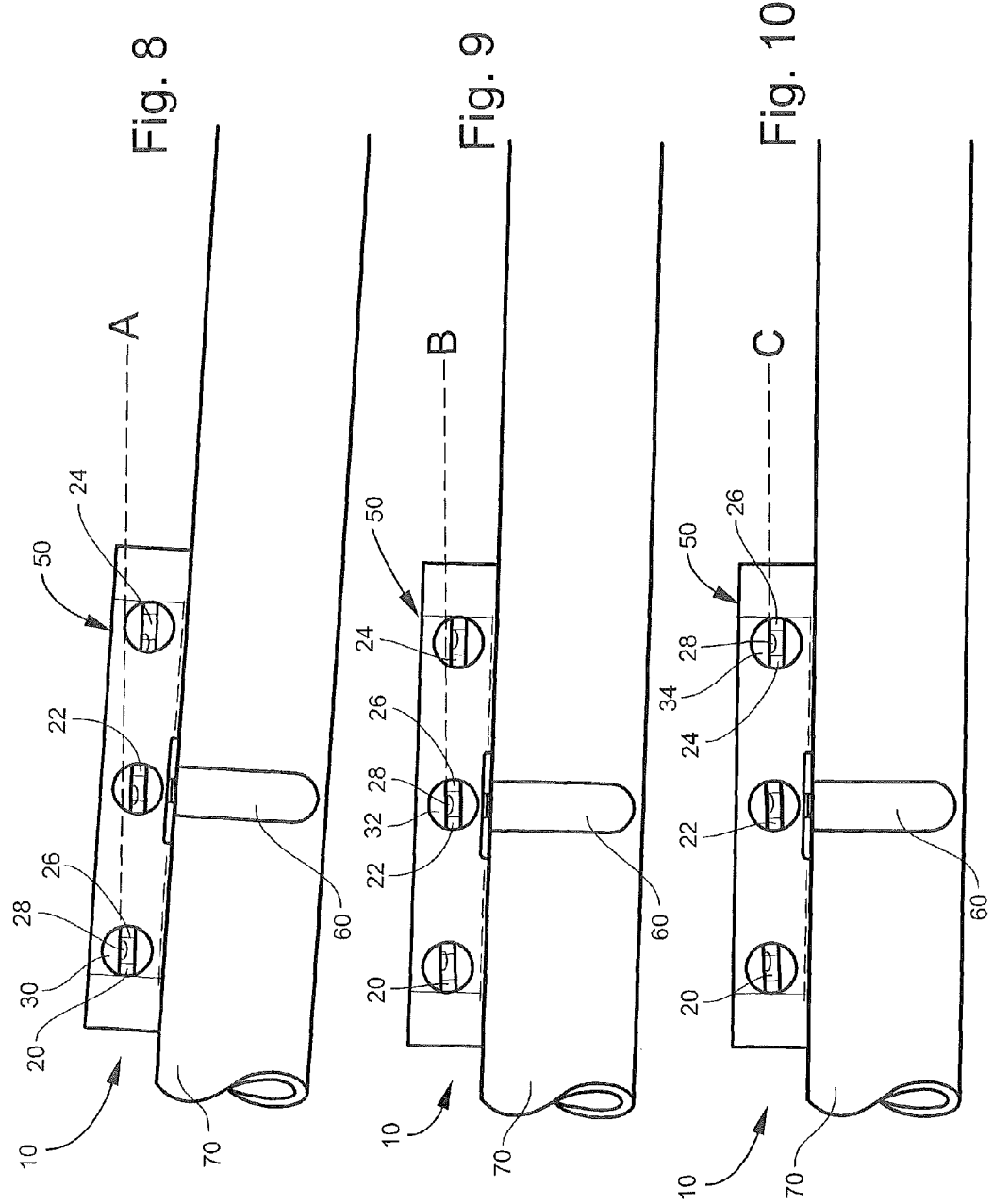

DEVICE AND METHOD FOR MEASURING AND ADJUSTING THE SLOPE OF A SURFACE

TECHNICAL FIELD AND BACKGROUND OF INVENTION

The invention relates to the field of construction tools. More particularly, the invention relates to the field of building construction tools utilized in measuring or adjusting the slope of a surface.

In the field of building construction, some surfaces such as floors or other elements such as moldings are typically required to be horizontal with respect to level ground. Similarly, some surfaces such as walls or other elements such as vent pipes or chimneys are typically required to be vertical or perpendicular with respect to level ground. Still other surfaces such as sloped roofs and porch flooring or other elements such as pipes may be required to be constructed at some acute angle to the horizontal. For instance, waste water drain pipes may be required by building codes to be installed at a slope of ⅛ inch per foot, ¼ inch per foot, or ½ inch per foot depending on particular applications. These slopes correspond to approximate angles from the horizontal of 0.60 degrees, 1.2 degrees, and 2.4 degrees, respectively.

Since at least the 1930s, those in the construction industry have had a tool to aid in the construction of horizontal and vertical surfaces. A "spirit" or "bubble" level is an instrument that typically includes a slightly curved or cylindrical glass tube which is filled with a liquid, such as an alcohol. In addition to the liquid, a small air void is enclosed within the glass tube. At even the slightest inclination off of the horizontal, relative to level ground, the bubble will travel away from the center of the tube as an indication that the surface is not level. The tube typically is fixed within an elongate member and may either be fixed parallel to the length of the elongate member or perpendicular to the length of the elongate member. In use, the elongate member is to be held against the surface to be measured. If one in the construction industry wishes to check to see if a construction surface is vertical and, thereby perpendicular to the horizontal, he will utilize a spirit level having the tube perpendicular to the length of the elongate member. Likewise, if he wishes to check to see if a construction surface is horizontal, he will utilize a spirit level having the tube parallel to the length of the elongate member.

Despite having such ready-made tools for measuring horizontal and vertical surfaces for at least 70 years, those engaged in the field of building construction have limited options for readily, easily, and accurately measuring and adjusting the slope of surfaces that are between horizontal and vertical, that is, those angles that are acute to the horizontal. This need is especially apparent for those slopes of slight angle, where accuracy is important, such as necessary for waste water gravity sewage drains. In order to measure such angles, those in the industry must use time-consuming methods such as physically measuring the rise (or fall) and run with an instrument designed for length measurement such as a tape measure. Those in the industry may use complicated, often inaccurate, devices requiring many adjustments by the use. Or, as is often the case, those in the industry simply "eyeball" the slope as a form of guess or estimation without physically measuring the slope. Such estimations can lead to considerable construction defects which can be costly to repair. Such estimations can lead to inefficiencies that are outside of design parameters. Thus, for many years there has been a long felt and unsatisfied need in the art for a device that can permit those in the construction industry to quickly and easily ascertain the angle of slope of a surface to ensure it is in conformity with applicable building codes, design guidelines, blueprints, preferred practices and the like, particularly as it relates to a slope of slight inclination.

SUMMARY OF THE INVENTION

The present invention is thus a method and device for measuring the slope of a building construction surface, such as a pipe, that has an incline having an angle acute to the horizontal. The device may have features in common with existing horizontal and vertical spirit levels and further include additional features which allow the user to ensure the acute angle is constructed as desired. That is, the device includes features of a traditional spirit level but is also capable of checking angles other than zero and ninety degrees, particularly angles associated with slopes of slight inclination. As such, the device is lightweight and is easily transported and operated by a single person. The device is accurate and resistant to shock.

According to one embodiment of the invention, the device includes an elongate rectangular member or frame. The elongate member has two broad flat sides, two narrow flat sides, and two opposing ends. The elongate member may be made of wood, fiberglass, plastic, or metal. The elongate member includes at least one slope indicator in the form of a clear tube positioned within the member. The clear tube is preferably cylindrical but may also be of other shapes such as rectangular. The clear tube may be made from a polymer or a glass and may have a colored tint. The clear tube is sealed so that it is air tight and contains a liquid and a small amount of a gas, the gas forming a single bubble within the liquid.

According to another embodiment of the invention, rather than a liquid and a gas bubble, the tube may contain two immiscible fluids such as liquids having different densities such as oil and water. In such an embodiment, there will be a larger volume of the fluid having the higher density and a smaller volume of the fluid having the lower density. In this way, the fluid having the lower density will function much like the gas bubble in the liquid in the alternate embodiment.

According to another embodiment of the invention, one of the sides of the frame is an index side for being positioned on and in contact with the surface to be measured. A plurality of slope indicators are fixed on the frame and positioned in relation to the index side at a predetermined angle for indicating whether or not the slope of the surface is equal to the predetermined angle. In this embodiment, when the slope of the surface to be measured is equal to the predetermined angle of a desired one of the slope indicators, the slope indicator functions to indicate that the desired slope of the surface has been achieved.

According to another embodiment of the invention, the slope indicators measure the slope of the surface electronically and provide an audio or visual indication that the slope of the surface is equal to the predetermined slope when the measurement of the slope of the surface is equal to the predetermined slope.

According to another embodiment of the invention, the slope indicators are tubes fixed at a predetermined angle relative to the index side of the frame, having a liquid and a gas bubble therein. The gas bubble in the respective tube is movable within the tube and each one of the tubes has a pair of reference lines on the surface of the tubes for visually indicating that the slope of the surface is equal to the predetermined slope when the bubble is located within the reference lines. Each one of the lines of the pair of reference lines is displaced the same distance from a notional center line that is located at a midpoint of the length of the tube. The distance between the reference lines is approximately equal to a width of the bubble.

According to another embodiment of the invention, the clear tube may be transparent or have a colored tint. Each tube may have a different color.

According to another embodiment of the invention, the liquid may be colored and each tube may have a different color.

According to another embodiment of the invention, the color of the tube and/or the color of the liquid within the tube may coordinate with a color code for the acute angle of the tube.

According to one embodiment of the invention, the slope indicator such as a tube is positioned at an acute angle to the length of the elongate member or frame.

According to another embodiment of the invention, the acute angle is 0.60°.

According to another embodiment of the invention, the acute angle is 1.2°.

According to another embodiment of the invention, the acute angle is 2.4°.

According to another embodiment of the invention, the acute angle is greater than 0.50° and less than 5.0°.

According to another embodiment of the invention, there is one, and only one, slope indicator.

According to another embodiment of the invention, there are three slope indicators such as clear tubes, each at an acute angle, where one of the angles is 0.60°, another is 1.2°, and another is 2.4°.

According to another embodiment of the invention, at least one slope indicator such as a clear tube is adjustable among 0.60°, 1.2°, and 2.4°.

According to another embodiment of the invention, the elongate member or frame has printed or inscribed thereon, adjacent to the slope indicator, such as a tube, fixed at 0.60°, a visual indication of ⅛ inch.

According to another embodiment of the invention, the elongate member or frame has printed or inscribed thereon, adjacent to the slope indicator, such as a tube, fixed at 1.2°, a visual indication of ¼ inch.

According to another embodiment of the invention, the elongate member or frame has printed or inscribed thereon, adjacent to the slope indicator, such as a tube, fixed at 2.4°, a visual indication of ½ inch.

According to another embodiment of the invention, the slope indicator, such as a clear tube, is positioned within the elongate member so it is visible from each one of the broad flat sides.

According to another embodiment of the invention, the slope indicator, such as a clear tube, is positioned within the elongate member or frame so it is visible from only one of the narrow flat sides.

According to one embodiment of the invention, the slope indicator, such as a clear tube, is positioned within the elongate member or frame so it is visible from each one of the narrow flat sides.

According to another embodiment of the invention, in addition to the acute angle, there is another slope indicator, such as a tube, positioned at 0° or 90° relative to the horizontal.

According to one embodiment of the invention, one of the narrow flat sides, which may be the index side, includes an indentation that has a connection to a strap used to removably attach the device to a cylindrical surface such as a pipe. The connection may be a snap connection where the female portion of the snap is fixed on the elongate member and the male portion of the snap is fixed on the strap.

According to one embodiment of the invention, the strap is a slap strap that wraps around a pipe. The slap strap is a resilient material, such as a thin cupped metal, that forms a generally circular shape when bent and returns to a generally linear shape unbent.

According to another embodiment of the invention, the elongate member or frame includes magnets for attaching the device to ferrous metals. The magnets may be positioned on the index side of the frame.

According to an embodiment of the invention, the method includes the steps of: providing a sloped surface to be measured and providing a slope standard that applies to the surface such as a construction code. The next step includes providing a device for measuring the slope of the surface to be measured wherein the device includes a rectangular frame having fixed therein a plurality of slope indicators such as tubes where each tube contains a liquid, a gas bubble, and a pair of parallel reference lines equally spaced around the center of the tube and each tube being fixed at a different slope to an index side of the rectangular frame and wherein the slope is a slight angle to the rectangular frame. The next step includes identifying the specific tube of the plurality of tubes of the device that most closely matches the slope standard previously provided. The index side of the device is then placed on the sloped surface in a direction parallel to the slope of the surface. The next step includes adjusting the slope of the sloped surface so that the bubble in the specific desired tube is centered between the parallel reference lines of the specific tube. The final step includes securing the sloped surface in place at the adjusted angle.

BRIEF DESCRIPTION OF THE DRAWINGS FIGURES

Features, aspects, and advantages of a preferred embodiment of the invention are better understood when the detailed description is read with reference to the accompanying drawing, in which:

FIG. 2 is a top perspective view of the invention showing the strap in an unwrapped position;

FIG. 3 is a bottom perspective view of the invention highlighting that the strap may be parallel to the length of the length of the invention or perpendicular when in use;

FIG. 6 is a side view of the invention placed on a horizontal surface;

FIG. 7 is a side view of the invention placed on a horizontal surface and highlighting the respective slopes and associated angles A, B, and C;

FIG. 8 is a side view of the invention placed on pipe where the pipe is at an angle to the horizontal equal to the angle of the tube A to the length of the device;

FIG. 9 is a side view of the invention placed on pipe where the pipe is at an angle to the horizontal equal to the angle of the tube B to the length of the device; and FIG. 10 is a side view of the invention placed on pipe where the pipe is at an angle to the horizontal equal to the angle of the tube C to the length of the device.

DETAILED DESCRIPTION

The present discussion is a description of exemplary embodiments only and is not intended as limiting the broader aspects of the present invention. The following example is provided to further illustrate the invention and is not to be construed to unduly limit the scope of the invention.

Figure 1:
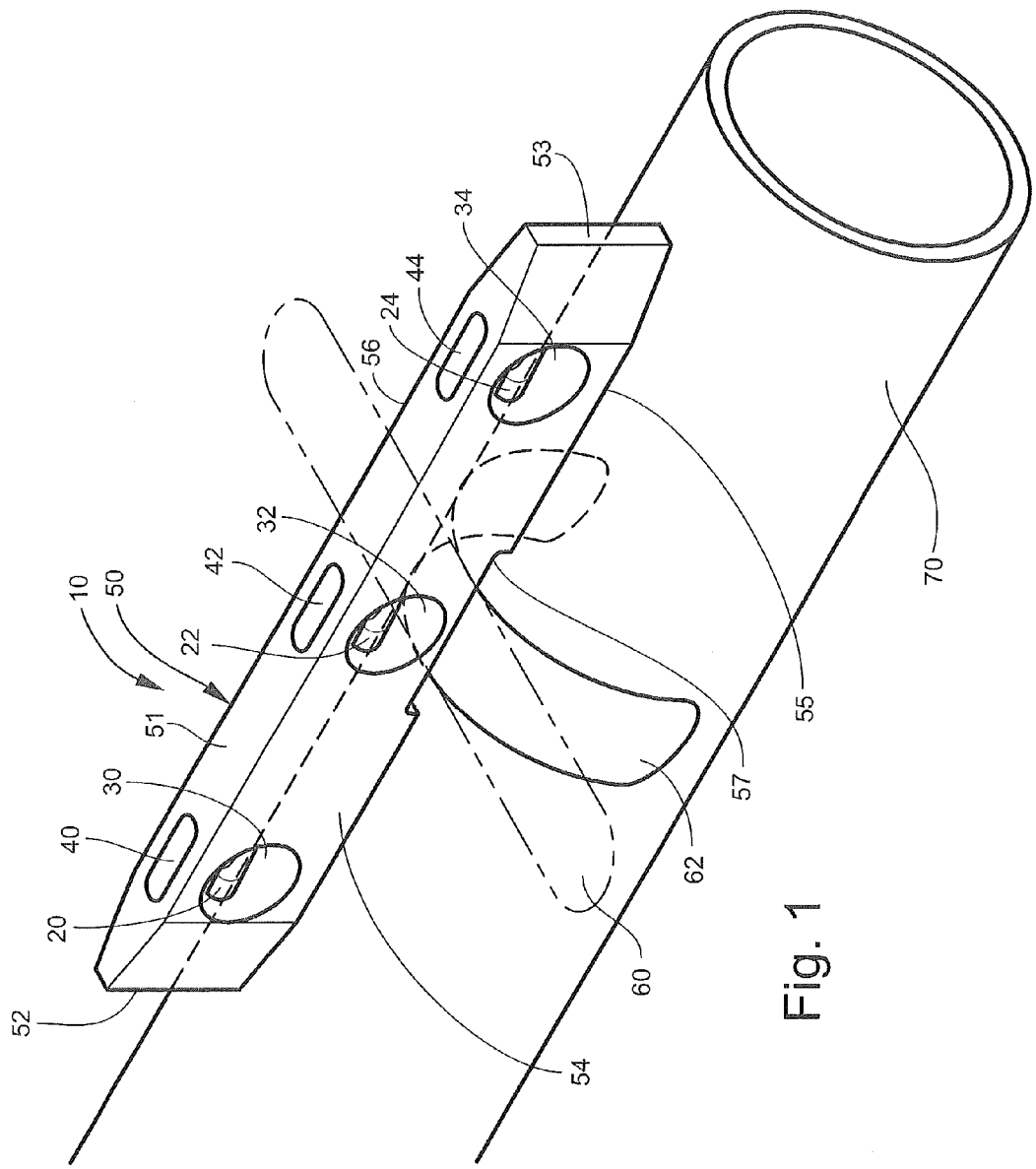
FIG. 1 is a perspective view of the invention removably attached to a pipe.

The preferred embodiment of the device is described herein with reference to the drawings. FIG. 1 shows an embodiment of the device 10 in use on a pipe 70. The invention is a device 10 used to measure the slope of the pipe 70 and to ensure that the slope of a pipe 70 conforms to a desired slope. The device includes a frame 50 which may be generally in the form of an elongate rectangular prism and may be rigid. In alternate embodiments, the shape of the frame 50 may be other than rectangular but the frame 50 will be rigid against bending in a direction perpendicular to the surface 70 to be measured. The frame 50 has top surface 51, front side surface 54, first opposed end surface 52, second opposed end surface 54, rear side surface 56, and bottom surface 55. The rigid frame may include an indentation 57 located on the bottom surface 55. The indentation 57 is just deep enough to hold a strap 60 such that a bottom surface of the strap 60 is in the same plane with the bottom surface 55 of the frame 50. In no case does the strap 60 extend beyond the bottom surface 55 of the frame 50.

Figure 4:
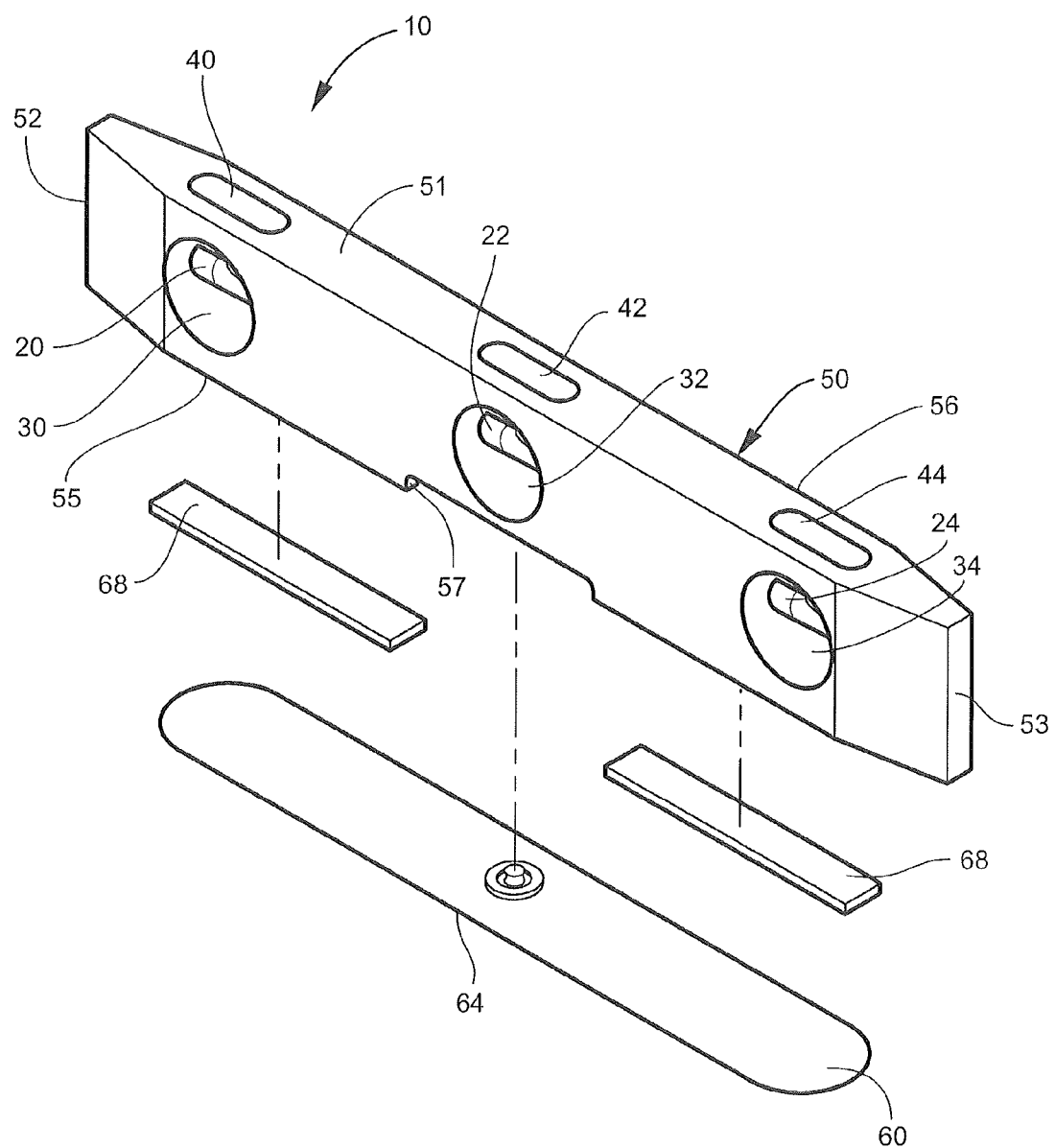
FIG. 4 is a top exploded view of the invention.
Figure 5:
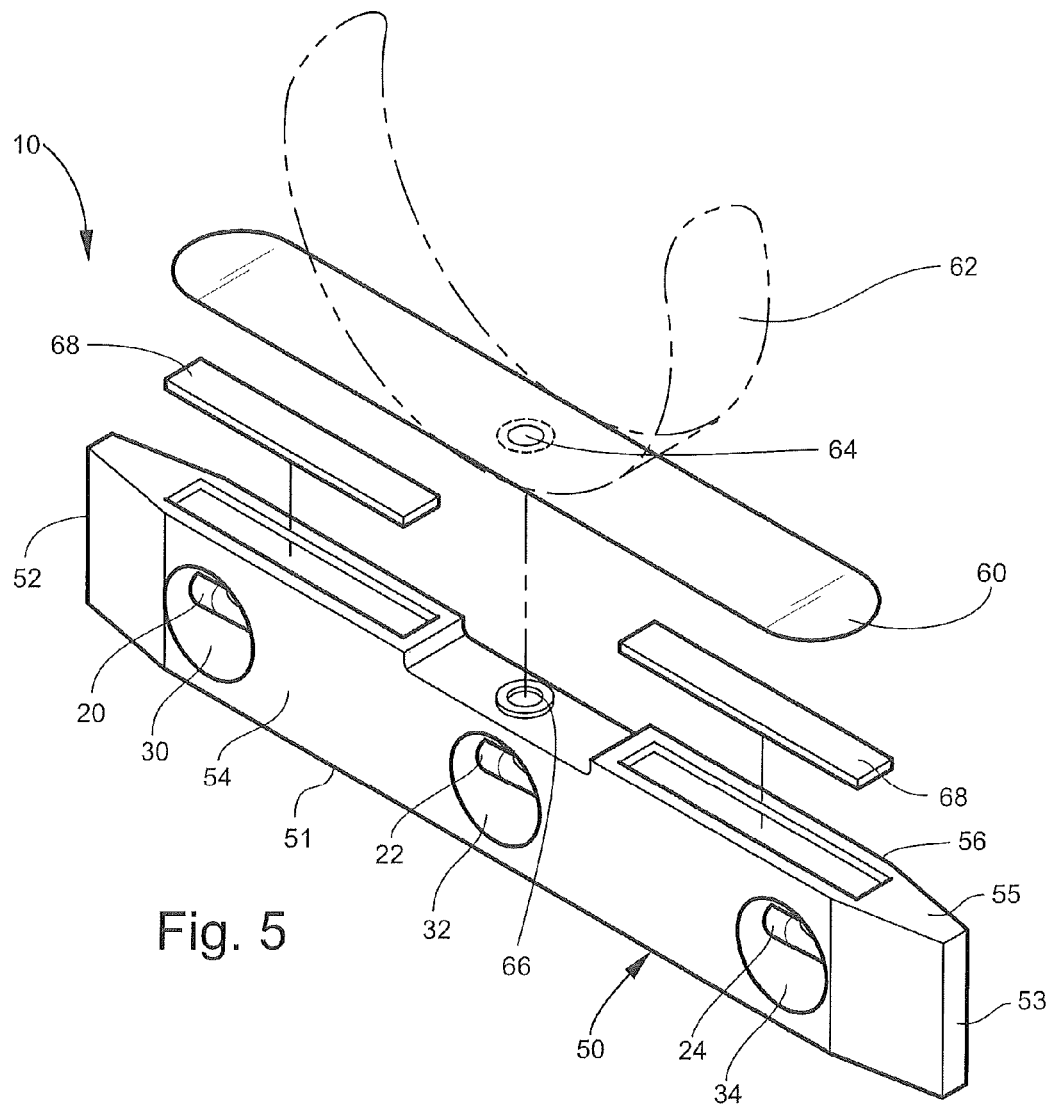
FIG. 5 is a bottom exploded view of the invention.

The strap 60 is designed to operate from an unwrapped position 60 to a wrapped position 62 such that it wraps around the pipe 70 to hold the frame 50 in place. The strap 60 may be a slap strap made of a thin metal that conforms to the shape of the pipe when wrapped 62 and applies a force to the pipe 70 when wrapped 62. As shown in FIG. 4 and FIG. 5, the strap may be attached using a snap connection such that a male snap 64 located on the strap 60 engages a female snap 66 located within the indentation 57 of the frame 50.

In addition to the strap 60, the frame 50 may be removably attached to a pipe 70 via magnets 68. The magnets 68 are attached to the bottom surface 55 of the frame 50 and are located on either side of the indentation 57.

The device 10 includes at least one clear tube located within the frame 50. As shown in FIG. 1, the preferred embodiment includes three such tubes 20, 22, and 24. In the preferred embodiment, each of the tubes 20, 22, and 24 is constructed in the shape of a curved cylinder though the invention contemplates other shape tubes (not shown) such as rectangular tubes. Though the tubes 20, 22, and 24 may be tinted with a color, they allow a user to observe the contents. Each of the tubes 20, 22, and 24 have a pair of guide lines 26 and are filled with a liquid such as an alcohol and a gas such as air forming a bubble 28 within the liquid. In the preferred embodiment, the guide lines 26 encircle the tube but the invention contemplates that they may be positioned in various orientations as long as they provide a visual indication that the bubble is centered along the length of the tubes 20, 22, or 24 when the particular tube is horizontal. When the tube 20, 22, or 24 is level with respect to the horizontal, the bubble 28 will be within the guide lines 26.

The tubes 20, 22, and 24 located within the frame 50 are visible by an observer via view ports 30, 32, and 34 located on the front surface 54 and also on the rear surface 56 of the frame 50. The tubes 20, 22, and 24 located within the frame 50 are also visible by an observer via top view ports 40, 42, and 44 located on the top surface 51 of the frame 50.

FIGS. 7, 8, 9, and 10 highlight another critical feature of the invention: the tubes 20, 22, and 24 are not aligned parallel to the bottom surface 55 of the rigid frame 50. The tubes 20, 22, and 24 are each aligned at a slight, acute angle A, B, or C to the bottom surface 55 of the rigid frame. Preferably, each of angles A, B, and C are at a different angle. Though the figures are not to scale, preferably angle A of tube 20 is approximately 2.4 degrees, angle B of tube 22 is approximately 1.2 degrees, and angle C of tube 24 is approximately 0.60 degrees. The frame 50 may have some indicia of the respective angle or associated slope affixed thereto on surfaces 54, 56, and 51 and the indicia may be color coded.

FIG. 8 shows the pipe 70 fixed at a slope to the horizontal that is associated with angle A of tube 20 with respect to the bottom surface 55 of the frame 50. Thus, the bubble 28 of tube 20 will be within guide lines 26 of tube 20 when angle A between the tube 20 and the bottom surface 55 of the frame 50 matches the same angle between the pipe 70 and the horizontal. Accordingly, as they are at different angles, the bubble 28 in tubes 22 and 24 will not be located within their respective guidelines 26.

FIG. 9 shows the pipe 70 fixed at a slope to the horizontal that is associated with angle B of tube 22 with respect to the bottom surface 55 of the frame 50. Thus, the bubble 28 of tube 22 will be within guide lines 26 of tube 22 when angle B between the tube 22 and the bottom surface 55 of the frame 50 matches the same angle between the pipe 70 and the horizontal. Accordingly, as they are at different angles, the bubble 28 in tubes 20 and 24 will not be located within their respective guidelines 26.

FIG. 10 shows the pipe 70 fixed at a slope to the horizontal that is associated with angle C of tube 24 with respect to the bottom surface 55 of the frame 50. Thus, the bubble 28 of tube 24 will be within guide lines 26 of tube 24 when angle C between the tube 24 and the bottom surface 55 of the frame 50 matches the same angle between the pipe 70 and the horizontal. Accordingly, as they are at different angles, the bubble 28 in tubes 20 and 22 will not be located within their respective guidelines 26.

The foregoing has described a device and method for measuring and adjusting the slope of a surface. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A device for determining the slope of a surface in relation to a predetermined slope in order to enable the surface to be positioned to equal the predetermined slope, and comprising:
  a. an elongate frame having an index side for being positioned on a surface, the index side further comprising an indentation and a strap, the indentation having a depth equal to or greater than the thickness of the strap and the strap being removably attached to the frame at a point located within the indention via a snap connection;
  b. a plurality of slope indicators comprising tubes having a liquid and a movable gas bubble therein, fixed on the frame and positioned in relation to the index side at a predetermined angle between 0.5 degrees and 5.0 degrees, wherein each of the tubes has a pair of reference lines on the surface of the tubes, the distance between the reference lines is approximately equal to a width of the gas bubble, and each of the reference lines are displaced the same distance from a notional center line that is located at a midpoint of the length of the tube, for visually indicating that the slope of the surface is equal to the redetermined slope when the bubble is within the reference lines; and
  c. whereby, when the slope of the surface is equal to the predetermined angle of a desired one of the slope indicators, the slope indicator functions to indicate that the desired slope of the surface has been achieved.

2. The device for determining the slope of a surface of claim 1 wherein the slope indicators measure the slope of the surface electronically and provide an audio or visual indication that the slope of the surface is equal to the predetermined slope when the measurement of the slope of the surface is equal to the predetermined slope.

3. The device for determining the slope of a surface of claim 1 wherein the plurality of slope indicators is equal to three and wherein the angle of a first tube of the slope indicators with respect to the index side of the frame is equal to 2.4 degrees, the angle of a second tube of the slope indicators with respect to the index side of the frame is equal to 1.2 degrees, and the angle of a third tube of the slope indicators with respect to the index side of the frame is equal to 0.60 degrees.

4. The device for determining the slope of a surface of claim 1 wherein the index side further comprises a plurality of magnets for attaching the device to a ferrous surface.

5. The device for determining the slope of a surface of claim 1 wherein the strap is a slap strap made of a deformable metal band.

6. The device for determining the slope of a surface of claim 1 wherein the strap is a slap strap made of a deformable metal band.

7. The device for determining the slope of a surface of claim 1 wherein each of the tubes is correlated to a visible identifier of a slope associated with the angle and the visible identifier is visible on the tube or on the frame adjacent to the tube.

8. A device for determining the slope of a surface in relation to a predetermined slope in order to enable the surface to be positioned to equal the predetermined slope, and comprising:
   a. an elongate frame having an index side for being positioned on the surface;
   b. a plurality of slope indicators comprising a first tube, a second tube, and a third tube, each tube having a liquid and a movable gas bubble therein, fixed on the frame and positioned in relation to the index side at a predetermined angles of 2.4 degrees, 1.2 degrees, and 0.60 degrees, respectively, wherein each of the tubes has a pair of reference lines on the surface of the tubes, the distance between the reference lines is approximately equal to a width of the gas bubble, and each of the reference lines are displaced the same distance from a notional center line that is located at a midpoint of the length of the tube, for visually indicating that the slope of the surface is equal to the predetermined slope when the bubble is within the reference lines;
   c. wherein, when the slope of the surface is equal to the predetermined angle of a desired one of the slope indicators, the slope indicator functions to indicate that the desired slope of the surface has been achieved;
   d. wherein each of the tubes is correlated to a visible identifier of a slope associated with the angle and the visible identifier is visible on the tube or on the frame adjacent to the tube; and
   e. wherein the visible identifiers are numbers which correspond to the number of inches of slope per twelve inches of linear run.

9. The device for determining the slope of a surface of claim 8 wherein the visible identifier are color coded where different slopes are associated with a different color.

10. A device for determining the slope of a surface in relation to a predetermined slope in order to enable the surface to be positioned to equal the predetermined slope, and comprising:
   a. an elongate frame having an index side;
   b. a first tube fixed on the frame at an angle of approximately 2.4 degrees with respect to the index side of the frame and comprising a liquid, a gas bubble being movable within the tube, and a pair of reference lines located on the surface of the tube where each one of the lines of the reference lines is parallel and displaced the same distance from a notional center line that is located on a midpoint of the length of the tube such that when the slope of the surface is equal to the angle of approximately 2.4 degrees, the bubble is positioned between the reference lines to visually indicate that the desired slope of the surface has been achieved;
   c. a second tube fixed on the frame at an angle of approximately 1.2 degrees with respect to the index side of the frame and comprising a liquid, a gas bubble being movable within the tube, and a pair of reference lines located on the surface of the tube where each one of the lines of the reference lines is parallel and displaced the same distance from a notional center line that is located on a midpoint of the length of the tube such that when the slope of the surface is equal to the angle of approximately 1.2 degrees, the bubble is positioned between the reference lines to visually indicate that the desired slope of the surface has been achieved;
   d. a third tube fixed on the frame at an angle of approximately 0.60 degrees with respect to the index side of the frame and comprising a liquid, a gas bubble being movable within the tube, and a pair of reference lines located on the surface of the tube where each one of the lines of the reference lines is parallel and displaced the same distance from a notional center line that is located on a midpoint of the length of the tube such that when the slope of the surface is equal to the angle of approximately 0.60 degrees, the bubble is positioned between the reference lines to visually indicate that the desired slope of the surface has been achieved;
   e. a visible identifier on or adjacent to each one of the tubes indicating the slope that can be adjusted using the respective tube, the visible identifier being in the form letters or numbers corresponding to the slope in inches per twelve inches of linear run; and
   f. a strap having a thickness equal to or less than the depth of the indentation of the frame, the strap being removably attached to the frame at a point located within the indentation via a snap connection, a male portion of the snap connection being fixed to the strap and the female portion of the snap connection being fixed to the frame.

11. The device for measuring the slope of a surface of claim 10 further comprising magnets fixedly attached to the index side of the frame for attaching the device to a ferrous surface.

12. The device for measuring the slope of a surface of claim 10 wherein the visible identifiers are color coded and the tubes are tinted to match the color.

13. A method for measuring the slope of a surface comprising the steps of:
   a. providing a sloped surface to be measured that has a slope of greater than 0.0 degrees and less than 5.0 degrees and providing a slope standard that applies to the sloped surface such as a building construction code;
   b. providing a device for measuring the slope of the surface to be measured wherein the device comprises:

i. an elongate frame having an index side and an indentation on the index side,
ii. a translucent, sealed tube fixed to the frame at an angle to the index side of the frame that corresponds to the slope standard that was provided in step a, and further comprising a liquid, a gas bubble, and a pair of reference lines located on the tube where each one of the lines of the reference lines is displaced the same distance from a notional center line that is located on a midpoint of the length of the tube, and
iii. a strap having a thickness equal to or less than the depth of the indentation of the index side of the frame, the strap being removably attached to the frame at a point located within the indentation via a snap connection;
c. placing the index side of the frame on the sloped surface in a direction parallel to the slope of the surface;
d. attaching the strap to the sloped surface thereby securing the frame to the sloped surface;
e. adjusting the slope of the sloped surface so that the gas bubble in the tube is centered between the reference lines of the tube; and
f. securing and fixing the sloped surface in place at the adjusted angle.

14. The method for measuring the slope of a surface of claim 13 wherein the frame provided in step b further comprises a plurality of magnets fixed to the index side of the frame and step d further comprises attaching the magnets to a ferrous surface.

15. The method of measuring the slope of a surface of claim 13 wherein the device provided in step b further comprises a plurality of tubes, each fixed at a different angle that is less than 5 degrees with respect to the index side of the frame and wherein a step b1 is inserted between step b and step c wherein step b1 comprises selecting the tube, from the plurality of tubes, that is equivalent to or nearly equivalent to and is associated with the slope standard supplied in step a.

16. The method of measuring the slope of a surface of claim 13 wherein the device provided in step b further comprises a set of three tubes, where one of the set of three tubes fixed at an angle of 2.4 degrees with respect to the index side of the frame, where one of the set of three tubes fixed at an angle of 1.2 degrees with respect to the index side of the frame, and where one of the set of three tubes fixed at an angle of 0.60 degrees with respect to the index side of the frame, and wherein a step b1 is inserted between step b and step c wherein step b1 comprises selecting the tube, from the set of tubes, that is equivalent to or nearly equivalent to and is associated with the slope standard supplied in step a.

* * * * *

UNITED STATES PATENT AND TRADEMARK OFFICE
CERTIFICATE OF CORRECTION

| | | |
|---|---|---|
| PATENT NO. | : 8,484,856 B1 | Page 1 of 1 |
| APPLICATION NO. | : 13/680548 | |
| DATED | : July 16, 2013 | |
| INVENTOR(S) | : Alan David Webb et al. | |

It is certified that error appears in the above-identified patent and that said Letters Patent is hereby corrected as shown below:

In the Claims

Column 6, line 64, delete the word "redetermined" and insert the word --predetermined--

Signed and Sealed this
Third Day of September, 2013

Teresa Stanek Rea
*Acting Director of the United States Patent and Trademark Office*